United States Patent [19]
Yablonsky

[11] Patent Number: 5,199,180
[45] Date of Patent: Apr. 6, 1993

[54] MACHINE GUARD SAFETY GAUGE/GUARDCHEK ™

[76] Inventor: Jack E. Yablonsky, 252 Bentrup Ct., Lenox, Mass. 01240

[21] Appl. No.: 877,146

[22] Filed: May 1, 1992

[51] Int. Cl.$^5$ .............................................. G01B 3/20
[52] U.S. Cl. ..................................... 33/501.45; 33/567
[58] Field of Search ............. 33/501.45, 501.05, 555.1, 33/567, 501.08, 809

[56] References Cited

U.S. PATENT DOCUMENTS

| | | | |
|---|---|---|---|
| 1,264,519 | 4/1918 | Hinson | 33/555.1 X |
| 1,638,885 | 8/1927 | Shea | 33/567 |
| 3,417,475 | 12/1968 | Vlasaty | 33/562 X |
| 3,771,232 | 11/1973 | Specht | 33/567 X |
| 4,888,876 | 12/1989 | Meredith et al. | 33/501.08 |

*Primary Examiner*—Harry N. Haroian

[57] ABSTRACT

A machine guard safety gauge is a single piece made up of a series of stepped cylinders having diameters equal to a maximum safe opening size from a hazard zone of a machine at corresponding combined lengths from a tip portion of the gauge. The centerlines of the cylinders share a common vertical plane and the cylinders share a common bottom edge. This design provides three dimensional structural stability and strength which allows the gauge to be used for both checking and setting up machine guards. A tapered tip design allows checking the positioning of abrasive wheel adjustable tool rests, tongue guards, and "nip points" in general.

10 Claims, 1 Drawing Sheet

MACHINE GUARD SAFETY GAUGE/GUARDCHEK ™

FIELD OF INVENTION

This invention relates to the field of machine guarding safety. In particular, the invention is a three dimensional gauge which allows for immediate and accurate determination of the adequacy of guards placed to provide safety from point of operation hazards. The dimensions and arrangement of the gauge were designed for ease of use and broad application.

BACKGROUND

Nearly all mechanical motions of a machine create potential hazards to the operator. Examples of movements which create such hazards include punching, shearing, bending, meshing gears, cutting, and rotating parts. All of these potential hazards can be eliminated or minimized by a properly designed and placed guarding mechanism. Barrier guards are typically designed and placed to allow for proper machine function while simultaneously inhibiting the entry of body parts (fingers). This is typically done by placing the guard at a specified distance from the hazard zone and limiting the opening size so that the body part cannot enter into this area of the machine. A common example can be viewed by examining any small portable household fan. The guarding enclosure is open to air, yet the openings cannot be penetrated deeply enough so that the rotating element of the fan contacts the body part. Hence, the size of the opening and distance from the hazard zone define effective guard design and placement.

PRIOR ART

The relationship between "size of opening" and distance from the hazard zone is well known. For example, "maximum permissible openings" as a function of distance are specified by the Occupational Safety and Health Administration (OSHA) in their standard for mechanical power presses (29CFR1910.217, Table 0–10). These dimensions as published have served as the design basis for several two dimensional gauges for determining proper guard placement for power presses. Devices of this type are commercially available.

SUMMARY OF INVENTION

This invention is a three dimensional gauge in which cylindrical, stepped members are constructed in a single piece. The third dimension provides additional utility and application. It provides structural strength for the gauge which allows it to be used in a shop setting for design, construct, setup and audit purposes. Tip design allows for utility which could not be achieved by prior art tools in that the specific geometry allows the tool to be used for checking positioning of abrasive wheel adjustable tool rests, tongue guards, as well as "nip points" in general. Other advantages of the invention are apparent to those skilled in the art of machine guard design, application, and safety.

DETAILED DESCRIPTION OF THE PREFERRED EMBODIMENT

Figure 1:
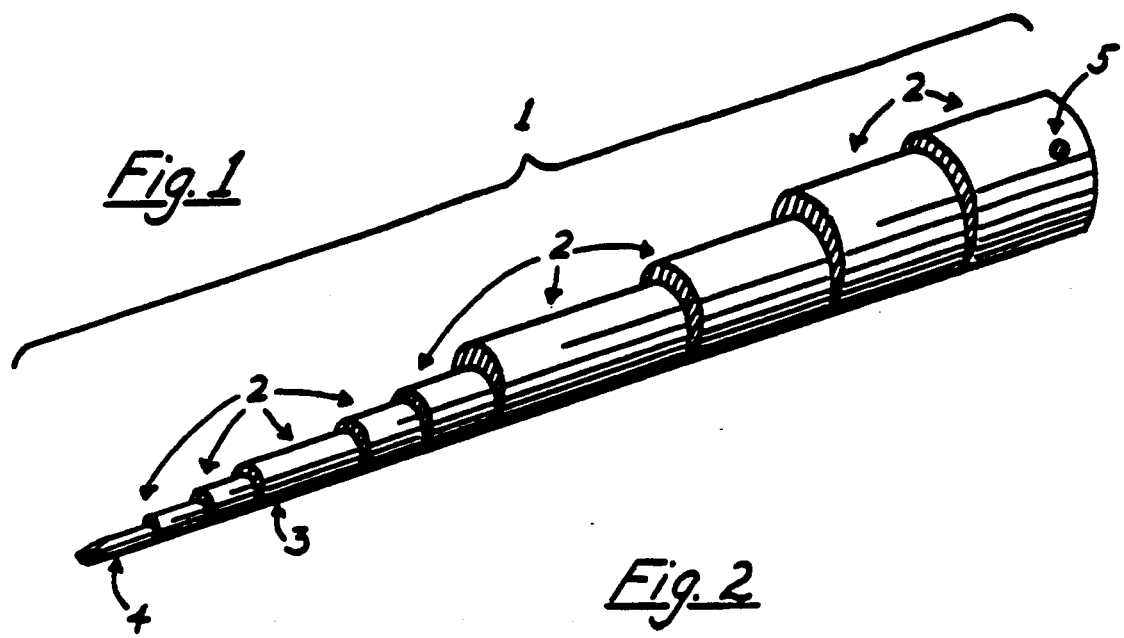
FIG. 1 is a perspective view of the device according to present invention.
Figure 2:
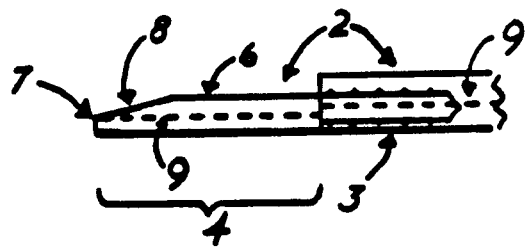
FIG. 2 is a side view of the tip design.
Figure 3:
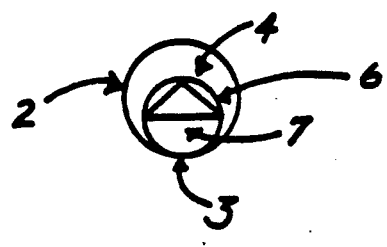
FIG. 3 is a front view of the tip design.

As shown in FIGS. 1–3, the machine safety gauge 1 is a single integral unit with no moving part, formed primarily from a series of cylinders 2 with stepped centerlines 9. The centerlines are parallel and common to a single vertical plane so that the cylinders 2 share a common bottom edge 3 formed as a straight line parallel to and co-planer with the centerlines. Most dimensions are suggested by 29CFR1910.217 and the prior art. The exception is the tip 4 of the gauge 1, which is not a true cylinder. The tip 4 is tapered from a ¼" cylinder section 6 to a half cylinder section 7 of the same diameter. The taper 8 occurs over a ½" length and provides a dimension of ⅛" in the vertical plane at 7. In a preferred embodiment, the section adjacent to the tip is the first true cylinder and is about ¼" in diameter and 1" long. Successive sections are of increasing diameter and of varying length according to the table shown below.

| Machine Guard Safety Gauge Table of Preferred Dimensions All dimensions in inches | | |
|---|---|---|
| Cylinder Diameter | Cylinder Length | Total Length |
| ⅛–¼* | 0.5 | 0.5 |
| ¼ | 1.0 | 1.5 |
| ⅜ | 1.0 | 2.5 |
| ½ | 1.0 | 3.5 |
| ⅝ | 2.0 | 5.5 |
| ¾ | 1.0 | 6.5 |
| ⅞ | 1.0 | 7.5 |
| 1¼ | 5.0 | 12.5 |
| 1½ | 3.0 | 15.5 |
| 1⅞ | 2.0 | 17.5 |
| 2¼ | 2.0 | 19.5 |

*This section not a true cylinder.

A small cylindrical hole 5 is provided in the last section. This feature allows for a hanging and storage mechanism. Total length of the gauge is about 19.5 inches. This total length is not critical to the invention. The gauge could be longer for additional utility. However, the cutoff length Was also chosen as a convenience feature so that the entire gauge fits diagonally in a standard briefcase.

In a preferred embodiment of the invention, the gauge cylinders 2 are made of a thermoplastic resin formed in one piece by injection molding, although suitable alternatives include machined wood, hollowed metal, or combinations thereof. This invention could also be designed and constructed so that smaller sections telescope into the larger members for storage convenience.

Tip 4 is preferably made from a steel rod for durability and includes an anchoring member 9 extending into adjacent cylinder(s) to prevent breakage of the less substantial and narrow tip 4.

The specific tip design (taper to ⅛" in the vertical plane but ¼" in the horizontal plane) provides a durable tool for checking the clearance on both an abrasive wheel work rest and the tongue guard. Such design also expands utility to guards which are intended to be adjusted or float with stock. In each case, clearance openings are intended to be ¼" or less. The tip can likewise be used to check guarding "in running nip points" where ⅛" is generally considered a safe dimension.

The invention improves the prior art of a two dimensional gauge by forming a gauge in three dimensions.

This increases the specific utility of the gauge from one designed specifically for power presses to one which can be used to check other barrier guards, including meshed guards commonly used on rotating shafts, couples, belts/pulleys, etc. In addition, the increased bulk of a three dimensional tool provides a quantum increase in structural strength. Hence, utility in a shop setting is increased for design, construct, setup, and audit purpose. Additionally, the three dimensional cylindrical form more closely simulates human dimensions. This feature improves user understanding of machine guarding intent and increases the value of the gauge for training purposes.

Although the present invention has been described with reference to a specific embodiment, it is not limited thereto and various changes in dimensions and materials could be made by one of skill in the art without departing from the spirit and scope of the claimed invention.

What is claimed:

1. An apparatus for setting and checking machine safety guards consisting essentially of a series of connected cylinders with parallel, stepped centerlines, said centerlines being common to a single vertical plane and said cylinders sharing a common bottom edge formed as a straight line parallel to and co-planar with said centerlines;
    wherein said series of connected cylinders have a tip at one end thereof, and said cylinders have diameters and lengths selected such that at any point on said gauge the cylinder diameter corresponds to a maximum safe opening size to a hazard zone of a machine at the corresponding combined cylinder length, as measured from the tip and said point.

2. The apparatus of claim 1 wherein said cylinders have progressively larger diameters.

3. The apparatus of claim 2 including a tip portion formed at a junction with said connected cylinders as a cylinder of a specified diameter with a centerline parallel and co-planer with said cylinder centerlines and formed at a free end as a half cylinder of said specific diameter with a straight taper between said junction and said free end.

4. The apparatus of claim 3 wherein said tip is tapered in a vertical direction.

5. The apparatus of claim 3 wherein said tip is formed of a steel rod.

6. The apparatus of claim 3 wherein said tip includes a reinforcing member extending axially into said connected cylinders.

7. The apparatus of claim 5 wherein said tip includes a reinforcing member extending axially into said connected cylinders.

8. The apparatus of claim 1 wherein said connected cylinders are formed of a thermoplastic resin formed by injection molding.

9. The apparatus of claim 3 wherein said progressive diameters of said connected cylinders correspond directly to maximum permissible openings at respective distances from said tip as specified by the following table wherein all dimensions are in inches:

| Cylinder diameter | Cylinder length | Total length |
|---|---|---|
| 0.125–0.25 tapered | 0.5 | 0.5 |
| 0.25 | 1.0 | 1.5 |
| 0.375 | 1.0 | 2.5 |
| 0.5 | 1.0 | 3.5 |
| 0.625 | 2.0 | 5.5 |
| 0.75 | 1.0 | 6.5 |
| 0.875 | 1.0 | 7.5 |
| 1.25 | 5.0 | 12.5 |
| 1.5 | 3.0 | 15.5 |
| 1.875 | 2.0 | 17.5 |
| 2.125 | 2.0 | 19.5 |

10. The apparatus of claim 2 including a small cylindrical hole in an end cylinder to allow for a hanging and storage mechanism.

* * * * *